United States Patent
Day et al.

(10) Patent No.: US 8,015,191 B2
(45) Date of Patent: Sep. 6, 2011

(54) IMPLEMENTING DYNAMIC PROCESSOR ALLOCATION BASED UPON DATA DENSITY

(75) Inventors: Paul R. Day, Rochester, MN (US); Randy L. Egan, Rochester, MN (US); Roger A. Mittelstadt, Byron, MN (US)

(73) Assignee: International Business Machines Corporation, Armonk, NY (US)

( * ) Notice: Subject to any disclaimer, the term of this patent is extended or adjusted under 35 U.S.C. 154(b) by 412 days.

(21) Appl. No.: 12/056,879

(22) Filed: Mar. 27, 2008

(65) Prior Publication Data

US 2009/0248764 A1    Oct. 1, 2009

(51) Int. Cl.
*G06F 7/00* (2006.01)

(52) U.S. Cl. ........ 707/745; 707/803; 711/100; 711/173; 345/505

(58) Field of Classification Search ........... 707/999.205, 707/745, 999.003, 999.101, 803; 711/100, 711/173; 345/505
See application file for complete search history.

(56) References Cited

U.S. PATENT DOCUMENTS

| 5,493,643 | A | * | 2/1996 | Soderberg et al. | 345/505 |
| 6,003,036 | A | * | 12/1999 | Martin | 707/999.102 |
| 6,216,125 | B1 | * | 4/2001 | Johnson | 707/999.004 |
| 2002/0052868 | A1 | * | 5/2002 | Mohindra et al. | 707/1 |
| 2003/0084057 | A1 | * | 5/2003 | Balogh | 707/100 |
| 2004/0267397 | A1 | * | 12/2004 | Doddi et al. | 700/110 |
| 2006/0155915 | A1 | * | 7/2006 | Pereira | 711/100 |

* cited by examiner

*Primary Examiner* — Hosain T Alam
*Assistant Examiner* — Jieying Tang
(74) *Attorney, Agent, or Firm* — Joan Pennington

(57) ABSTRACT

Dynamic processor allocation is implemented based upon bitmap data density. A bitmap index is used to process the query. A bitmap is created for the query. The bitmap is partitioned into single I/O operations. A variable partition size is provided based upon data density. Data density for each partition is calculated. Processors are assigned based upon data density of each partition. Then the partitions are processed and query results are returned.

12 Claims, 4 Drawing Sheets

IMPLEMENTING DYNAMIC PROCESSOR ALLOCATION BASED UPON DATA DENSITY

FIELD OF THE INVENTION

The present invention relates generally to the data processing field, and more particularly, relates to a method, apparatus and computer program product for implementing dynamic processor allocation based upon data density.

DESCRIPTION OF THE RELATED ART

Performance of queries in a database management system is critical. In a world of ever expanding data, customers continue to grow their files at an increasing rate. As a result, performance will deteriorate unless something is done. Better mechanisms invented and implemented by an operating system to keep pace with customers' needs is therefore essential.

A database management system typically includes a query optimizer that attempts to optimize the performance of a query. The query optimizer selects from multiple access plans or possible implementations of a query to execute the query with the greatest efficiency.

The query optimizer determines how to run the query for best performance, such as allocation of system resources, determining which access plan to use, which index to use, and many implementation techniques intelligently taken within the optimizer without customer awareness. The optimizer therefore will decide which index is best for a given query, from a list of radix indexes and bitmap indexes that may be built over the file that is being queried. In some cases, the optimizer may even build an index on its own if the customer has not already built a good index over the file.

When the optimizer determines that using a bitmap index is the best way to process a query, a need exists for an improved mechanism to the bitmap art for optimizing database query processing with a faster way to provide query results using the bitmap data in the index in a database management system.

SUMMARY OF THE INVENTION

Principal aspects of the present invention are to provide a method, apparatus and computer program product for implementing dynamic processor allocation based upon bitmap data density. Other important aspects of the present invention are to provide such method, apparatus and computer program product for implementing dynamic processor allocation based upon bitmap data density substantially without negative effect and that overcome many of the disadvantages of prior art arrangements.

In brief, a method, apparatus and computer program product are provided for implementing dynamic processor allocation based upon bitmap data density. A bitmap index is used to process the query. A bitmap is created for the query. The bitmap is partitioned into single I/O operations or blocked operations, where there is a block of records retrieved in one I/O operation, and that each record is represented by one bit in the bitmap. Data density for each partition is calculated. Processors are assigned based upon data density of each partition. Then the partitions are processed and query results are returned.

In accordance with features of the invention, dynamically allocating processor resources for a Symmetric Multiprocessing (SMP) system is effectively and efficiently performed based on the data density returned from a result bitmap that is created from scanning a bitmap index, when performing a database query.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

Figure 1:
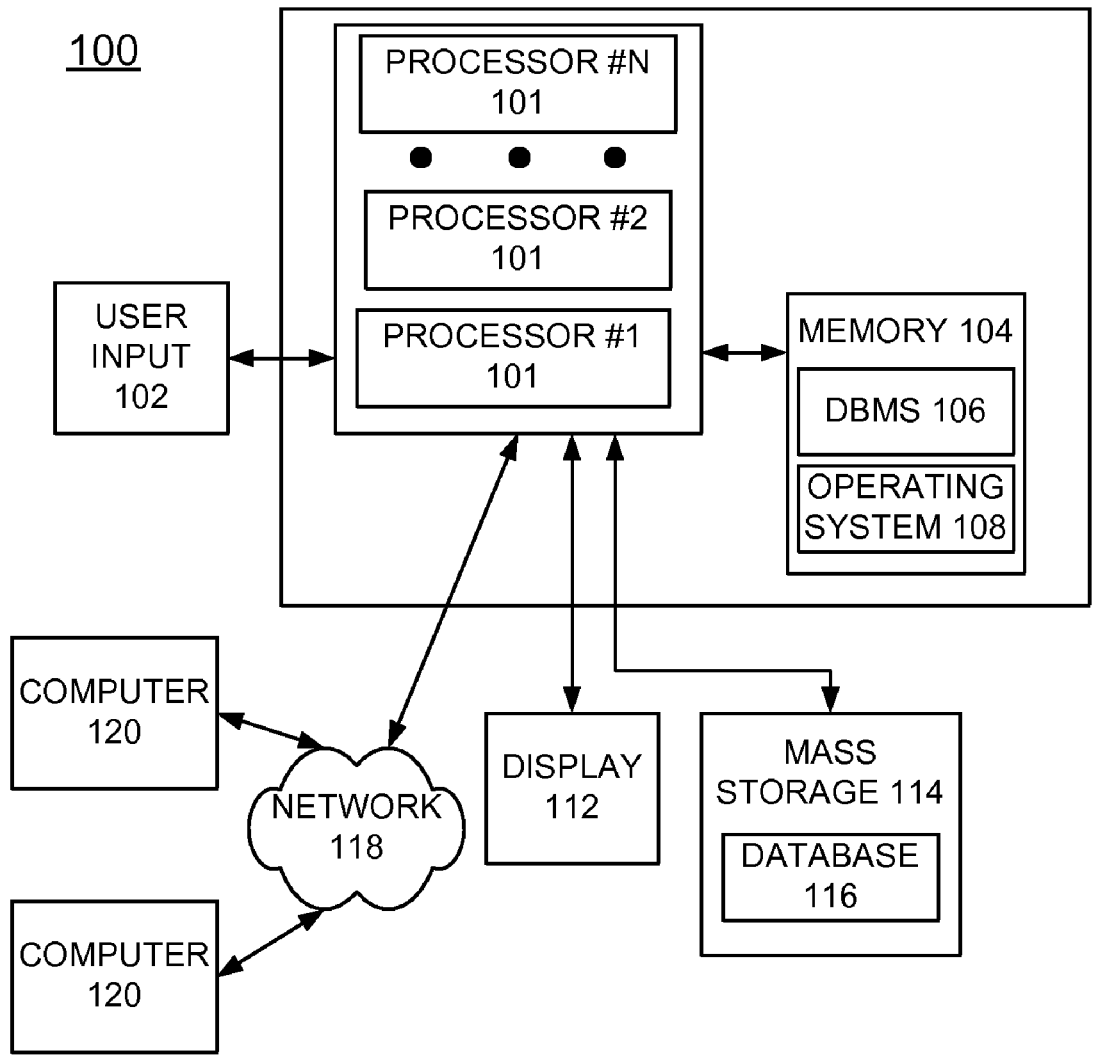
FIG. 1 is a block diagram illustrating a networked computer system for implementing methods for optimizing database query processing in accordance with the preferred embodiment.

Having reference now to the drawings, in FIG. 1, there is shown an exemplary networked computer system generally designated by the reference character 100 for implementing methods for optimizing database query processing in accordance with the preferred embodiment. Computer system 100 implements dynamic processor allocation based upon data density for optimizing database query processing in accordance with the preferred embodiment.

Computer system 100 is, for example, a Symmetric Multiprocessing (SMP) system including a plurality of processors 101 coupled to a system bus. The multiple processors 101 are coupled to a user input 102 and a memory 104. Computer system 100 includes a database management system (DBMS) 106 and an operating system 108 stored in memory 104.

Computer system 100 includes a display 112 and a mass storage 114, such as a direct access storage device (DASD), storing a database 116, or alternatively the database 116 is stored on another computer coupled to the computer system 100 via a network 118, such as a client computer 120.

Figure 2:
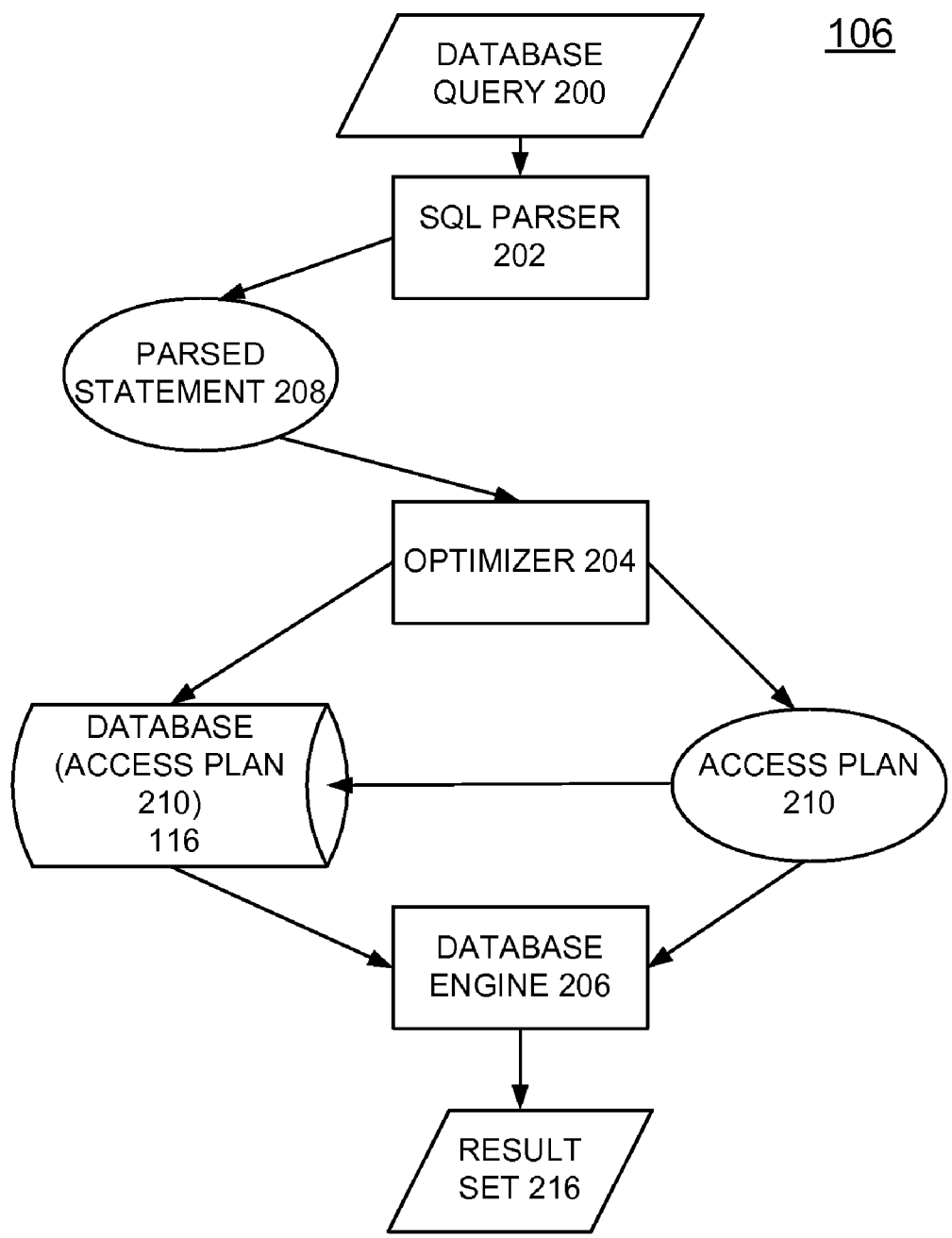
FIG. 2 is a block diagram illustrating the principal components of the database management system in the networked computer system of FIG. 1 and the flow of information between these components for implementing methods for optimizing database query bitmap processing in accordance with the preferred embodiment.

Referring also to FIG. 2, an exemplary implementation of the database management system (DBMS) 106 is shown. The principal components of the database management system (DBMS) 106 include an SQL (Structured Query Language) parser 202, a query optimizer 204 of the preferred embodiment, and a database engine 206. SQL parser 202 receives from a user a database query object 200, which is provided in the form of an SQL statement. SQL parser 202 generates a parsed statement 208, which is passed to the optimizer 204 for query optimization. As a result of query optimization, an access plan 210 is generated, often using data such as platform capabilities, query content information, and the like, and the access plan is stored in the database 116, which is stored in the mass storage 114. The access plan is forwarded to the database engine 206 for execution of the data base query on the information in the database 116. The result of the execution of the data base query is typically stored in a result set, as represented by a block 216.

Other components may be incorporated into the database management system (DBMS) 106, which can include other suitable database management architectures. Other database programming and organizational architectures may also be used consistent with the invention. It should be understood that the present invention is not limited to the illustrated database management system (DBMS) 106.

Computer system 100 is shown in simplified form sufficient for an understanding of the present invention. It should be understood that the present invention is not limited for use with the illustrated computer system 100. The illustrated processor system 100 is not intended to imply architectural or functional limitations. The present invention can be used with various hardware implementations and systems and various other internal hardware devices.

Various commercially available processor systems could be used for computer system 100, for example, a selected server computer system manufactured and sold by International Business Machines Corporation.

Those skilled in the art will recognize that the exemplary environment illustrated in FIGS. 1 and 2 is not intended to limit the present invention. Those skilled in the art will recognize that other alternative hardware and software environments can be used without departing from the scope of the present invention.

In accordance with features of the preferred embodiment, a method of the invention provides a faster way to provide query results using the bitmap data in the index. The method efficiently dynamically allocates processor resources for Symmetric Multiprocessing (SMP), based upon the data density returned from a result bitmap that is created from scanning an index, when performing a database query.

Figure 3:
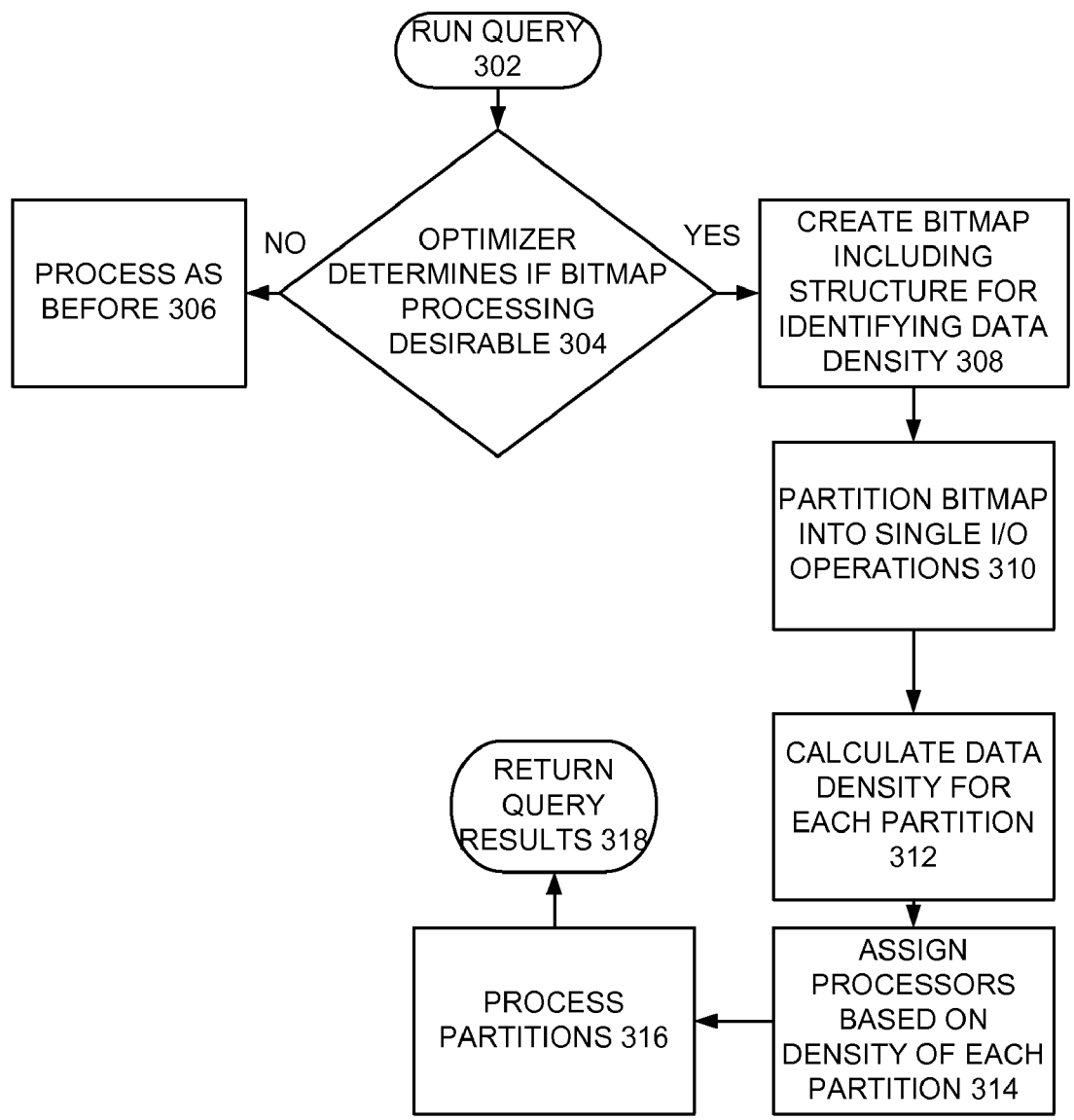
FIG. 3 is a flow chart illustrating exemplary steps performed by the computer system of FIG. 1 for implementing methods for optimizing database query processing in accordance with the preferred embodiment.

Referring to FIG. 3, there are shown exemplary steps performed by the computer system 100 for implementing methods for optimizing database query processing in accordance with the preferred embodiment. First, an incoming database query to run is received as indicated in a block 302. The optimizer determines if bitmap processing is desirable as indicated at a block 304. When bitmap processing is not identified by the optimizer, then normal processing continues as indicated at a block 306.

When bitmap processing is identified by the optimizer to process the query at decision block 304, then a bitmap is created or else an existing bitmap is used for the query including a structure for identifying data density as indicated at a block 308.

The bitmap is an array of bits where each bit represents a row in the table. The bits are used to determine which rows in a table contain values for the columns, which are being selected. The bitmap is generated by scanning an index to identify the rows which should be selected.

The bitmap is partitioned into single I/O operations as indicated at a block 310. Data density for each partition is calculated as indicated at a block 312. Processors are assigned based upon data density of each partition as indicated at a block 314. Then the partitions are processed as indicated at a block 316 and query results are returned as indicated at a block 318 to complete the query processing.

Consider the following example, and query
Example: (with index over column City in file Table):
Query:
Select Name from Table where City='Byron'

TABLE

| Name | City | Resulting bitmap for value of Byron |
|---|---|---|
| John | Rochester | 0 |
| Jane | Byron | 1 |
| Fred | Albert Lea | 0 |
| May | Austin | 0 |

TABLE-continued

| Name | City | Resulting bitmap for value of Byron |
|---|---|---|
| Dan | Byron | 1 |
| June | Rochester | 0 |
| Ann | Kasson | 0 |
| ... | ... | 0 |

The system can use the bitmap for skip sequential processing to sequentially scan the file, skipping rows in the table that are not selected based on the bitmap created during processing of the query. Because the bitmap represents the physical sequence of the rows in the table bitmaps are advantageous for SMP because the bitmaps are easily partitioned. The partitions can then be easily assigned to a processor for retrieval of the result rows.

Current known query processing implementations typically breakup these partitions with a partition size whose bits represent the number of rows which can be retrieved in a single I/O operation.

In accordance with features of the invention, the processing method takes advantage of the previous support by dynamically allocating the processors based on the data density of the number of ON bits in a partition. For a given partition, when only 1 bit is on, the processor will have very little work to perform. However, if all bits are on in a partition, the processor will be very busy performing further selection and projection operations on the selected rows.

In accordance with features of the invention, instead of allocating these partitions to a fixed size, the size is dynamically tuned so that a partition that selects a high number of rows is instead broken up into smaller partitions so that multiple processors can be used to process more dense ranges of the data, which would then achieve a higher degree of parallelism. Likewise, for portions of the bitmap which are sparse, wider ranges of bits are assigned because most of the processing time will be I/O bound.

During the building of the bitmap, a value or structure can be used to determine how many bits are on in a particular section of the bitmap. Using this information along with the bitmap, the system will be able to determine what sections of a file will require more processor power to retrieve the rows, and allocate the current processor capabilities according to the data density of the file based on the bitmap feedback. Consider the following Example:

When building the bitmap index, keeping track of the density of rows being selected is easily implemented and is taken into account when determining where to apply the available processor power to maximize system resources.

Following is a bitmap for a particular key of an index.
00001000000000010000100000111111111101000001
0101010000000000000000000000
RRN (Relative Record Number):

1 ---------26
   3 bits

27 ---------39
             11 bits

40 ---------52
                       4 bits

53 ---------74
                                0 bits

In accordance with features of the invention, the processing method includes a structure that is passed with the bitmap to determine data density, such as, for the above Example:
RRN 1-26 (3 bits ON=Low density)

RRN 27-39 (11 bits ON=High density)
RRN 40-52 (4 bits ON=Medium density)
RRN 53-74 (0 bits ON=No density)

Having this information when skip sequential table scanning the file, more processors are applied to the area of the file that requires more CPU, for the higher data density, to process the records. In this example, if we have 4 processors available, one processor is used to process RRNs 1-26, two processors for 27-39, one processor for 40-52 and 0 processors for 53-74; rather than breaking the file into equal partitions as done conventionally, and thereby providing enhanced performance with the method of the invention.

Figure 4:
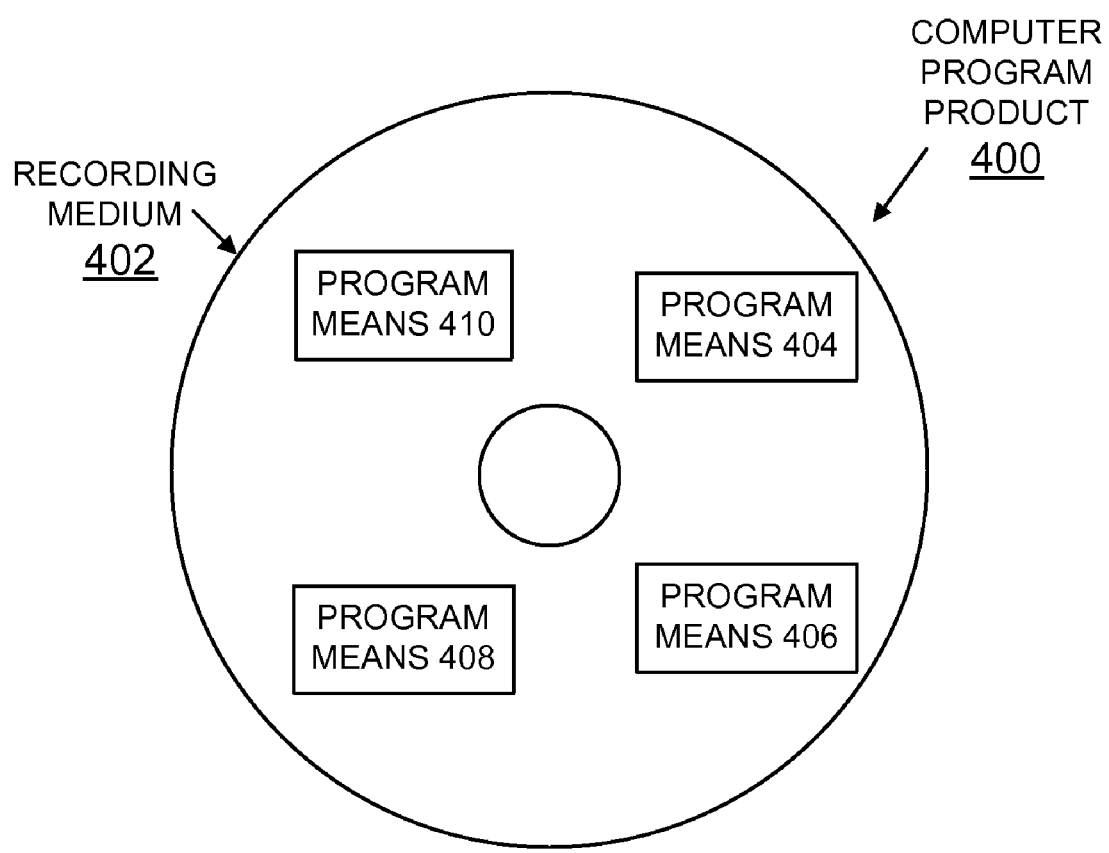
FIG. 4 is a block diagram illustrating a computer program product in accordance with the preferred embodiment.

Referring now to FIG. 4, an article of manufacture or a computer program product 400 of the invention is illustrated. The computer program product 400 includes a recording medium 402, such as, a floppy disk, a high capacity read only memory in the form of an optically read compact disk or CD-ROM, a tape, or another similar computer program product. Recording medium 402 stores program means 404, 406, 408, 410 on the medium 402 for carrying out the methods for implementing dynamic processor allocation based upon data density for optimizing database query processing of the preferred embodiment in the system 100 of FIG. 1.

A sequence of program instructions or a logical assembly of one or more interrelated modules defined by the recorded program means 404, 406, 408, 410, direct the computer system 100 for dynamically allocating processors based upon data density for optimizing database query processing of the preferred embodiment.

While the present invention has been described with reference to the details of the embodiments of the invention shown in the drawing, these details are not intended to limit the scope of the invention as claimed in the appended claims.

What is claimed is:

1. A method for implementing dynamic processor allocation for optimizing database query processing comprising the steps:
    creating a bitmap index for a database query with a structure for identifying data density;
    partitioning said bitmap index for said database query into a plurality of partitions having a variable partition size whose bits represent a number of rows being retrieved in a single I/O operation; said variable partition size being based upon ranges of dense data and ranges of sparse data;
    calculating bitmap data density for each partition of said bitmap index for said database query;
    dynamically assigning multiple processors for partition processing based upon said calculated data density of each partition of said bitmap index for said database query, enabling said dynamically assigned multiple processors to achieve a high degree of parallelism optimizing database query processing; and
    processing the partitions of said bitmap index for said database query with the assigned processors, optimizing database query processing.

2. The method for implementing dynamic processor allocation as recited in claim 1 wherein calculating data density for each partition of said bitmap for said database query includes using said structure included with said bitmap index to determine the data density of selected records.

3. The method for implementing dynamic processor allocation as recited in claim 1 further includes initial steps of identifying available processor resources for processing said database query.

4. The method for implementing dynamic processor allocation as recited in claim 1 further includes the steps of returning results for said database query to the user.

5. An apparatus for implementing dynamic processor allocation for optimizing database query processing comprising:
    a plurality of processors;
    a database management system; said database management system creating a bitmap index for a database query with a structure for identifying data density;
    said database management system partitioning said bitmap index for said database query into a plurality of partitions having a variable partition size whose bits represent a number of rows being retrieved in a single I/O operation; said variable partition size based upon ranges of dense data and ranges of sparse data;
    said database management system calculating bitmap data density for each partition of said bitmap index for said database query;
    said database management system dynamically assigning said plurality of processors for partition processing based upon said calculated data density of each partition of said bitmap for said database query, enabling said dynamically assigned plurality of processors to achieve a high degree of parallelism optimizing database query processing; and
    said plurality of processors processing the partitions of said bitmap index for said database query, optimizing database query processing.

6. The apparatus for implementing dynamic processor allocation as recited in claim 5 further includes said plurality of processors returning results for said database query to a user.

7. The apparatus for implementing dynamic processor allocation as recited in claim 5 wherein said database management system performs initial steps of identifying available processor resources for processing said database query.

8. The apparatus for implementing dynamic processor allocation as recited in claim 5 wherein said database management system calculating data density for each partition of said bitmap index includes said database management system using said structure included with said bitmap index to determine the data density of selected records.

9. A computer-readable storage medium encoded with a computer program product for implementing dynamic processor allocation for optimizing database query processing in a computer system, said computer-readable storage medium encoded with said computer program product including instructions executed by the computer system to cause the computer system to perform the steps of:
    creating a bitmap index for a database query with a structure for identifying data density;
    partitioning said bitmap index for said database query into a plurality of partitions having a variable partition size whose bits represent a number of rows being retrieved in a single I/O operation; said variable partition size being based upon ranges of dense data and ranges of sparse data;
    calculating bitmap data density for each partition of said bitmap index for said database query;
    dynamically assigning multiple processors for partition processing based upon said calculated data density of each partition of said bitmap index for said database query, enabling said dynamically assigned multiple processors to achieve a high degree of parallelism optimizing database query processing; and
    processing the partitions of said bitmap index for said database query with the assigned processors, optimizing database query processing.

10. The computer-readable storage medium encoded with a computer program product for implementing dynamic processor allocation as recited in claim 9 wherein calculating bitmap data density for each partition of said bitmap index for said database query includes using said structure included with said bitmap index to determine the data density of selected records.

11. The computer-readable storage medium encoded with a computer program product for implementing dynamic processor allocation as recited in claim 9 further includes initial steps of identifying available processor resources for processing said database query.

12. The computer-readable storage medium encoded with a computer program product for implementing dynamic processor allocation as recited in claim 9 further includes the steps of returning results for said database query to the user.

* * * * *